(12) United States Patent
Ronström (10) Patent No.: US 6,216,126 B1
(45) Date of Patent: Apr. 10, 2001

(54) METHOD FOR TRANSACTION WITHIN A DISTRIBUTED DATABASE (75) Inventor: Ulf Mikael Ronström, Hägersten (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/084,502

(22) Filed: May 27, 1998

(30) Foreign Application Priority Data

May 28, 1997 (SE) .................................................. 9702014

(51) Int. Cl.$^7$ ...................................................... G06F 17/30
(52) U.S. Cl. ............................ 707/10; 707/203; 707/205; 707/102; 707/204
(58) Field of Search ............................ 707/10, 201, 202, 707/205, 102, 203, 103; 714/16; 705/8; 709/101; 395/182.18

(56) References Cited

U.S. PATENT DOCUMENTS

| | | | |
|---|---|---|---|
| 4,755,792 | 7/1988 | Pezzolo et al. ....................... | 340/538 |
| 5,072,370 | 12/1991 | Durdik . | |
| 5,212,788 | * 5/1993 | Lomet et al. ......................... | 707/201 |
| 5,287,501 | * 2/1994 | Lomet ................................... | 707/202 |
| 5,291,594 | * 3/1994 | Sekiguchi et al. .................... | 707/201 |
| 5,404,508 | 4/1995 | Konrad et al. ....................... | 707/202 |
| 5,423,037 | 6/1995 | Hvasshovd ............................ | 707/202 |
| 5,555,404 | 9/1996 | Torbjønsen et al. ................. | 707/202 |

(List continued on next page.)

OTHER PUBLICATIONS

Uehara et al., "a Framework of Customizing Transactions in Persistent Object management for advanced Applications", IEEE, 1995, pp. 84–93.*

Pu et al., "Implementation of a Prototype Superdatabase", IEEE, 1990, pp. 3–7.*

Salzberg et al., "Timestamping after Commit", IEEE, 1994, pp. 160–167.*

*Primary Examiner*—Wayne Amsbury
*Assistant Examiner*—Thuy Pardo
(74) *Attorney, Agent, or Firm*—Burns, Doane, Swecker & Mathis, LLP (57) ABSTRACT

The present invention relates to a method of performing a transaction that affects several nodes within a system of nodes in which information belonging to a distributed database is stored. The transaction originates from a transaction coordinator (1) and affects at least one group of nodes which comprises a first node (n1), a second node (n2) separate from the first node (n1) and possible intermediate nodes (n3) which comprise further nodes that are separated from one another and from the first and the second node. The transaction is opened with a first phase in which the transaction coordinator sends a "prepare"-message (a) to the first node (n1), the first node then sends a request (b) for preparation or an "unprepared"-message to the second node (n2) either directly or via one or more intermediate nodes (n3), whereafter the second node sends a "prepared"-message or an "unprepared"-message (c) directly to the transaction coordinator (1), which concludes the first phase. In a second phase, the transaction coordinator (1) sends to the second node (n2) a message (d) regarding measures to be taken and the second node then sends the message (e) regarding measures to be taken to the first node (n1), either directly or via one or more intermediate nodes. The first node then sends a concluding message (f) to the transaction coordinator (1), which concludes the second phase. The message (d) regarding measures to be taken is either a "commit"-message or an "abort"-message and the concluding message (f) is either a "committed"-message or an "aborted"-message, depending on whether the first phase was concluded with "prepared" or "unprepared".

30 Claims, 4 Drawing Sheets

U.S. PATENT DOCUMENTS

| | | | |
|---|---|---|---|
| 5,581,750 * | 12/1996 | Haderle et al. | 707/202 |
| 5,640,561 * | 6/1997 | Satoh et al. | 707/202 |
| 5,675,791 * | 10/1997 | Bhide et al. | 707/205 |
| 5,701,480 * | 12/1997 | Raz | 709/101 |
| 5,752,026 * | 5/1998 | Fortier | 707/103 |
| 5,799,305 * | 8/1998 | Bortvedt et al. | 707/10 |
| 5,799,322 * | 8/1998 | Mosher, Jr. | 707/202 |
| 5,835,757 * | 11/1998 | Oulid-Aissa et al. | 707/10 |
| 5,850,507 * | 12/1998 | Ngai et al. | 714/16 |
| 5,862,318 * | 1/1999 | Habben | 395/182.18 |
| 5,884,327 * | 3/1999 | Cotner et al. | 707/202 |
| 5,893,117 * | 4/1999 | Wang | 707/203 |
| 5,960,194 * | 9/1999 | Choy et al. | 707/102 |
| 5,991,771 * | 11/1999 | Falls et al. | 707/202 |
| 6,073,109 * | 6/2000 | Flores et al. | 705/8 |

* cited by examiner

METHOD FOR TRANSACTION WITHIN A DISTRIBUTED DATABASE

FIELD OF INVENTION

The present invention relates to a method intended for the optimization of the transaction protocol that is used in transactions between a plurality of nodes within a system of nodes in which information belonging to a distributed data base is stored. The information is divided up into tables.

The transaction originates from a transaction coordinator and affects at least one group of parts of at least one first table of the tables in the database. Such a group will include at least one first and one second table part and possibly one or more further parts.

The first part is stored within a first node and the second part is stored within a second node, this second node being separate from the first node. Possible other parts within the group are stored in intermediate nodes, these intermediate nodes being comprised of further nodes that are separate from each other and also from the first and the second nodes.

The transaction is comprised of a two-safe transaction, which means that the transaction is performed when all nodes affected by the transaction are able to perform the transaction, and that the transaction is aborted when any one of the nodes affected by the transaction is unable to carry out the transaction.

BACKGROUND OF THE INVENTION

It has long been known that what is referred to here as a "system" can constitute a part of a network and includes a plurality of different mutually coacting nodes, by forming the nodes in a distributed data base for instance. In such a system, different transactions constantly take place between two or more nodes. These transactions shall be carried out in a positive and time effective manner.

So-called distributed transactions means that a transaction shall be performed between a plurality of nodes or participants. A transaction may involve any commitment that concerns a plurality of nodes. Two methods are well known in connection with distributed transactions, these methods being traditional commit in two phases and linear commit. By commit is meant that a participant has undertaken to do something and also does it.

It is also known to utilize safety copying, or back-up copying, of information in a distributed data base. Thus, a primary copy of part of a table is stored within a first node and a second copy of the same part is stored within a second node.

A primary copy with associated secondary copy is called a fragment in this document. A transaction that affects a part of a table thus also affects a fragment of a table that includes both a primary copy and a secondary copy of this part of the table. When a distributed transaction can include a plurality of different tables, or a plurality of different parts of a table, a plurality of different fragment and associated copies will also affected.

Traditional commit in two phases and linear commit are beneficial in different ways in respect of a transaction that affects a plurality of fragments. This will be described in more detail below with reference to the accompanying drawings.

However, it will be mentioned briefly at this stage that

"traditional commit in two phases" requires a large number of messages to be sent, although this can be performed partly in parallel and therewith places high requirements on processor and transmission capacity, but affords relatively short response times, whereas "linear commit" requires a smaller number of messages to be sent, although essentially serially, and therewith places less demand on available processor and transmission capacity, but gives relatively longer response times in one and the same transaction.

It is also known to use so-called system redundancy with the intention of obtaining redundancy in a system, meaning that a parallel secondary copy of the complete system is found. A second copy is completely separate from the primary copy with regard to hardware.

Promotion of a secondary system to a primary system only takes place in the event of a total collapse of the primary system, i.e. a total crash.

So-called blocking of the system can occur should a transaction coordinator crash during a transaction. This means that the system must wait until the crashed transaction coordinator has re-started or until a secondary copy of the transaction coordinator is promoted to a primary copy and taken over the role of transaction coordinator.

It is known to create a so-called "non-blocking coordinator" in this context. One such coordinator is described in the publication "Location and Replication independent recovery in a highly available database", Svein Erik Bratsberg, Svein-Olof Hvasshovel, Öysten Torbjörnsen. Telenor R&D.

In brief, this method involves the use of parallel transaction coordinators, which in turn entails very high performance costs.

Mention is also made here to the publication "D3 Dynamic Data Distribution Algorithm" by Chamberlain, published at the conference "Very Large Databases" in Vancouver, 1992, which also describes the handling of a crashing transaction coordinator during a transaction.

SUMMARY OF THE INVENTION

Technical Problems

When considering the earlier standpoint of techniques and with a starting point from a method of carrying out a transaction that affects a number of nodes within a system of nodes in which information belonging to a distributed data base is stored, wherein the information is divided up into tables, wherein the transaction originates from a transaction coordinator and affects at least one group of parts of at least a first of said tables, wherein the group includes at least one first and one second part and possibly one or more further parts, wherein the first part is stored within a first node and the second part is stored within a second node that is separate from the first node, and wherein possible other parts within the group are stored in intermediate nodes which are formed by further nodes that are separated from each other and from the first and the second node, and wherein the transaction is comprised of a two-safe transaction, it will be seen that a problem resides in enabling such a transaction to be performed quickly and safely when seen in relation to available processor and transmission capacity.

Another technical problem is one of being able to divide such a transaction into essentially two phases where only a few messages need be sent in relation to "traditional commit in two phases" and where a faster response time is obtained in relation to "linear commit".

Another technical problem is one of being able to provide such a transaction when the transaction affects a plurality of groups where respective groups include two or more parts.

Another technical problem is one of being able to adapt a transaction protocol specifically to provide simple and effective handling of a transaction that affects a plurality of different fragments, where each fragment includes both a primary copy and one or more back-up copies, such as a secondary copy and a stand-by copy.

Another technical problem is one of being able to adapt a transaction protocol to provide simple handling of crashed nodes during a transaction, and also of a crashed transaction coordinator, without the system falling into a blocked state. Another technical problem is one of setting a lock in the correct manner and at the right time, and to remove the lock in the correct way and at the right time in conjunction with a transaction, so as to be able to provide a transaction in solely two phases that also affords safe handling of a transaction with respect to any nodes that crash during the transaction.

Another technical problem is one of being able to update a secondary system in conjunction with a transaction, without needing to introduce further phases into the transaction.

Another technical problem is one of being able to enable a secondary system to be updated in relation to the application and a lock applied to affected fragments to be released in a simple and effective manner.

Another technical problem is one of being able to enable updating of a secondary system to be effected in conjunction with a transaction in different positive ways depending on the requirements placed on safety with respect to different transactions.

It also be seen that a technical problem is one of providing a possibility of selecting a transaction coordinator within the secondary system in a simple and effective manner which will also enable the load on the nodes of the secondary system to be regulated when distributing the transaction coordinatorship.

Solution

With the intention of solving one or more of the aforesaid technical problems, the present invention provides a method for use in a transaction that affects a number of nodes within a system of nodes in which information belonging to a distributed database is stored in table form.

The transaction originates from a transaction coordinator and affects at least one group of parts of at least a first of said tables, where respective groups include at least one first and one second part and possibly one or more further parts.

The first part is stored in a first node, the second part is stored in a second node that is separate form the first node, and possible other table parts in the group are stored in intermediate nodes which may comprise further nodes that are separate from each other and from the first and the second nodes.

The transaction is comprised of a two-safe transaction.

With the intention of providing a fast and reliable method of performing such a transaction in relation to available processor and transmission capacity, it is proposed in accordance with the present invention that the transaction is opened with a first phase in which:

the transaction coordinator sends a message "prepare" to the first node, in other words a request for the preparation of the transaction, when the first node is able to undertake the transaction, said first node then sends the preparation request to the second node, either directly or via one or more intermediate nodes, or when the first node is unable to undertake to carry out the transaction, said first node then sends a message "unprepared" to the second node, either directly or via one or more intermediate nodes, when the second node is able to carry out the transaction, said second node then sends a message "prepared", i.e. that all affected nodes are prepared to carry out the transaction, directly to the transaction coordinator, or when the second node is unable to carry out the transaction or when the second node has received the message "unprepared", said second node then sends a message "unprepared", directly to the transaction coordinator, which concludes the first phase.

The first phase is followed by a second phase, in which:

the transaction coordinator sends to the second node a message concerning the measures to be taken;

the second node then sends to the first node the message concerning the measures to be taken, either directly or via one or more intermediate nodes; and the first node then sends a concluding message to the transaction coordinator, which concludes the second phase.

The message concerning measures to be taken is a commit message, i.e. carry out the measures according to the transaction, and the concluding message is "committed", i.e. the measures according to the transaction will be carried out if the first phase is concluded with a message "prepared".

On the other hand, if the first phase is concluded with a message "unprepared" the message concerning the measures to be carried out is an "abort" message, i.e. the transaction is aborted, and the concluding message is then "aborted", i.e. the transaction is aborted.

This is a simple description of the manner in which a group is handled. However, the transaction will very often affect further groups of table parts where respective groups include parts belonging to the first table and/or parts that belong to other tables in the database and that are separate from the first table.

These parts are stored in relative first and second nodes and possibly in one or more intermediate nodes that are separate from each other within respective groups of parts.

In this case it is proposed in accordance with the present invention that the first phase is opened with the transaction coordinator requesting respective first nodes to prepare and is concluded with a message "prepared" or "unprepared" from respective second nodes to the transaction coordinator.

The second phase is opened with the message sent from the transaction coordinator to respective second nodes with regard to the measures to be carried out, and is terminated with the concluding message from respective first nodes to the transaction coordinator.

In this case, the message is a "commit" message and the concluding message is a "committed" message when the first phase is concluded with a "prepared" message from all second nodes.

The message concerning the measures to be carried out is an "abort" message and the concluding message is "aborted" when the first phase is concluded with a message "unprepared" from any second node.

Thus, when a transaction affects several nodes, the invention is based essentially on dividing these nodes into groups and the messages are sent serially within respective groups and parallel to respective groups from the transaction coordinator.

The first phase is opened with a message from the transaction coordinator to the first node in respective groups and is concluded with a message sent from the last node in respective groups directly to the transaction coordinator.

The second phase is opened with a message from the transaction coordinator to the last node in respective groups and is concluded with a message sent from the first node in respective groups directly to the transaction coordinator.

The present invention is particularly useful when the first part is allocated a higher priority than second or other parts in respective groups, and when respective groups include one or more further parts that are stored in the intermediate node or nodes.

In this case, the message is sent in the first phase serially from the first node to the intermediate node or nodes and from there to the second node, and the message in the second phase is sent serially from the second node to the intermediate node or nodes, and from there to the first node.

Particular application is found when respective groups constitute a database fragment that includes the first part, the second part and a further part stored in a third node, and where the higher priority consists in the first part comprising a primary copy of part of a table, and the further part comprises a secondary or back-up copy of the primary copy, and the second part comprises a stand-by copy of the primary copy.

The present invention also provides a sure way of carrying out transactions where all copies within a fragment are updated and where a crash of all copies in a fragment need not necessarily result in blocking of the system. This is achieved by applying a lock to respective copies belonging to a fragment in conjunction with carrying out a transaction and releasing said lock from said respective copies, whereby the preparation of the first node involves applying a lock to all copies belonging to the fragment in the first phase.

In accordance with one embodiment of the invention, the lock applied to respective copies by the first node is not released until the first node has received the message regarding measures to be carried out and has sent the concluding message.

This lock will be applied in accordance with some suitable method, such that solely those parts of respective copies that are affected by the transaction will be made unavailable to other transactions while leaving other parts available for such other transactions.

Should one of the nodes within a fragment affected by the transaction crash while carrying out the transaction, it is proposed in accordance with the invention that the transaction coordinator checks all ongoing message transmissions, the phase of the transaction that has been halted is restarted from the beginning, the messages are sent in accordance with this phase but with the crashed node excluded from the message chain, and that a node that receives a previously received message ignores the message and forwards the same.

On the other hand, if the crashed node is comprised of a first node within a fragment that is affected by the transaction and if the crash occurs during the preparatory phase of the transaction, the transaction is aborted.

It is also proposed in accordance with the present invention that if the transaction coordinator crashes during a transaction, a system coordinator is adapted to detect the crash of any node in the system, and that the system coordinator sends a general query to all nodes in the system asking whether any node is participating in a transaction in which the crashed node is the transaction coordinator, a new node is assigned the role of transaction coordinator, all nodes in respective fragments affected by the transaction compile a status report which is sent to the new transaction coordinator and which includes node identity, fragment identity, transaction status, and whether the node is a primary, secondary or stand-by copy in respective fragments, and that the new transaction coordinator decides on the basis of the status reports whether the transaction shall be continued or aborted.

The aforesaid method can also be applied when respective groups solely include a first and a second part, where the higher priority consists in the first part constituting a primary copy of a part of a table, and the second part comprises a secondary copy of the primary copy.

When using a secondary copy of the total system, i.e. both a primary and a secondary system, with the intention of enabling such a secondary system to be updated in conjunction with a transaction, it is proposed in accordance with the invention that updating of the secondary system is requested prior to releasing the lock on respective copies.

Updating of the secondary system can be effected in one step, and can also be achieved by a one-safe transmission or a limited two-safe transmission.

The method that is chosen will depend on the level of safety required by each transaction. It is proposed in accordance with the invention that those attributes that control the transaction will indicate whether updating of the secondary system shall be effected by one-safe transmission or limited two-safe transmission.

When updating is effected by a one-safe transmission, respective first nodes affected by the transaction send a message to corresponding nodes in the secondary system informing these nodes of the measures that shall be carried out, i.e. a "commit" message. The transaction then continues without waiting for a response from the affected nodes in the secondary system to the effect of whether or not the measures can be carried out.

When updating the secondary system through a limited two-safe transmission, respective first nodes affected by the transaction send to the corresponding nodes in the secondary system a message informing said nodes of the measures to be carried out, i.e. a "commit" message, and awaits a response from the affected nodes within the secondary system as part of the transaction, said message being answered by a "committed" message, which indicates to the first node that the measures will be carried out and that the secondary system will thus be updated in accordance with the transaction, or by an "abort" message, which indicates to the first node that the measures will not be carried out and that the secondary system will not therefore be updated in accordance with the transaction.

The limitation in the two-safe transmission is that nodes in the secondary system are unable to ask for the transaction to be aborted.

It is also proposed in accordance with the invention that an indication that the secondary system will not be updated in accordance with the transaction will cause the secondary system to be re-started so as to correctly constitute a copy of the system.

With the intention of enabling a transaction coordinator to be chosen simply and effectively in the secondary system when updating said secondary system in conjunction with a transaction, it is proposed in accordance with the invention that the choice of transaction coordinator within said secondary system is made possible by the transaction coordinator in the primary system selecting a logical transaction coordinator from a mapping table that covers possible logical transaction coordinators within the secondary system.

Respective logical transaction coordinators in the mapping table can be mapped to a physical node that operates in the secondary system.

A system coordinator in the secondary system ensures that all positions on the mapping table are occupied and that these nodes are available to act as a transaction coordinator.

With the intention of enabling the load on the nodes in the secondary system to be regulated to a given extent, it is proposed in accordance with the invention that when certain nodes are heavily loaded, the system coordinator within the secondary system will be able to ensure that these heavily loaded nodes will not be present in the mapping table.

Advantages

Those advantages that are primarily characteristic of an inventive method reside in the possibility of carrying out transactions in a distributed database with greater reliability and with more speed than has been possible hitherto.

This is made possible by virtue of the fact that a transaction performed in accordance with the present invention results in shorter response times in the case of transactions that affect a plurality of fragments than is possible by means of "linear commit", which is the usual transaction protocol in the case of the distributed transactions that affect a plurality of fragments with associated copies.

The invention also provides a non-blocking system and shorter delay times when one or more nodes crash during a transaction.

The present invention also provides the possibility of updating a secondary system without requiring the addition of further phases in the transaction for carrying out such updating.

The primary characteristic features of an inventive method are set forth in the characterizing clause of the following claim 1.

BRIEF DESCRIPTION OF THE DRAWINGS

Earlier known methods and a method according to the present invention will now be described in more detail with reference to the accompanying drawings, in which.

DESCRIPTION OF KNOWN METHODS RELATING TO TRANSACTIONS IN DISTRIBUTED DATABASES

With the intention of enabling the present invention to be more readily understood whilst, at the same time, disclosing the advantages that are afforded by the present invention, the known technology will now be described in slightly more detail.

Initially, the "traditional commit in two phases" will be described, this being a well known method of carrying out distributed transactions. Despite its designation, this method includes three phases, of which two affect the actual transaction. These three phases are:

updating the transaction preparation and commitment carrying out the measures when all participants have committed themselves, otherwise no measure is carried out.

The first phase is an opening phase in which a transaction coordinator prepares the transaction by diverse updatings. In the second phase, the transaction coordinator sends a message "prepare" which is a request to all participants to prepare for a given measure and respective participants prepare themselves to carry out the measure to be taken. Respective participants respond with the message "prepared" if they are able to undertake to carry out the measure, or the message "unprepared" if they are not able to carry out the measure concerned.

In either the opening phase or the preparatory phase, a lock is applied to that part of the database that is affected by the transaction, so that any other transactions that may concern the same part of the database must wait until the ongoing transaction has been concluded. This is done in order to prevent the conditions for a commitment being changed during the actual transaction.

Such a lock can be established in different ways and will thus include everything from locking of an entire node to locking of solely that part of the database that is affected by the transaction. The present invention is not dependent on the type of lock used, and consequently the lock will not be described in any further detail in this document.

Phase three of the method is then opened. In this phase, the transaction coordinator receives the "prepared" message from all participating nodes, and the transaction coordinator sends a commit message, which is an order to carry out the measures. Otherwise, if the transaction coordinator receives an unprepared message from any participating node, the transaction coordinator sends an "abort"-message, which is an order not to carry out any measure.

Phases one and two can be made a common phase, where preparation also includes updating prior to the transaction.

Thus, a traditional commit in two phases between two nodes requires the transmission of at least four messages between the transaction coordinator and respective participants. In the following example, a node 1 is the transaction coordinator and a node 2 is a participant. The four messages are:

1: "prepare" from node 1 to node 2,
2: "prepared" or "unprepared" from node 2 to node 1,
3: "commit" or "abort" from node 1 to node 2, and
4: "committed" or "aborted" from node 2 to node 1.

In a system, several nodes can be affected by a transaction. For instance, there may be a hierarchy of nodes where a transaction coordinator need not necessarily be aware of any further nodes located further down in the hierarchy than those nodes to which the transaction coordinator is directly connected and that are affected by the transaction.

Figure 1:
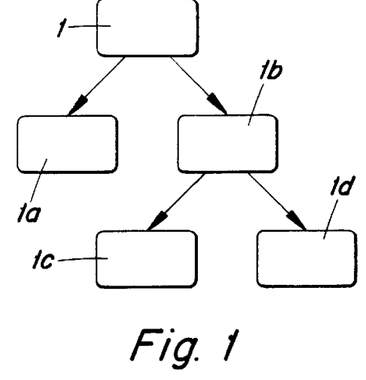
FIG. 1 is a highly simplified, schematic illustration of part of a system of nodes and their mutual relationships.

FIG. 1 shows an example of one such hierarchy, where a transaction coordinator 1 commences a transaction that affects participants 1a and 1b.

FIG. 1 also shows that participant 1b constitutes a coordinator for participants 1c and 1d, without the transaction coordinator needing to be aware of this.

Communication between the transaction coordinator 1 and participant 1a and participant 1b respectively can take place simultaneously, meaning that even though the transaction takes place from the transaction coordinator to a number of participants it need not necessarily take a longer time to effect the transmission, since the four messages are sent to and from the various participants simultaneously.

By "simultaneously" is not necessarily meant absolute simultaneousness, since the transmission capacity between different nodes, the processor capacity within different nodes and the response times from different nodes may vary. For instance, the response time from 1a may be shorter than the response time from 1b, since 1b needs to carry out certain operations with 1c and 1d before it can answer the transaction coordinator 1.

Thus, traditional commit in two phases gives relatively short response times, but normally requires the transmission of more messages than other methods.

It is also possible to shift the coordinatorship, therewith enabling commit in two phases to be optimized. This type of optimization is usual in the databases of telecommunications systems. Such optimization is also desirable in situations where a user is not equally as reliable as a server. For instance, it is not desirable for a home computer user to be a transaction coordinator in a telecommunications data-base.

One example of a shift of coordinatorship is a so-called "linear commit", which is an optimization of traditional commit in two phases, where the number of messages required is reduced in the case when a plurality of nodes are affected by a transaction.

Figure 2:
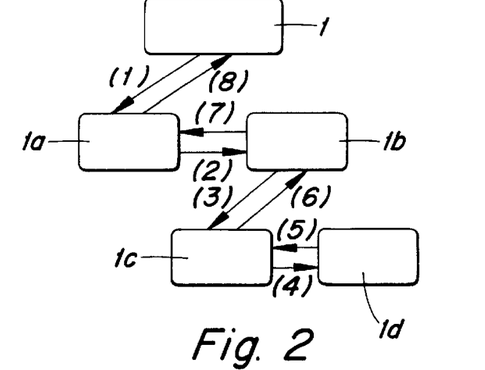
FIG. 2 is a schematic illustration of how a linear commit can be carried out in accordance with known technology.

FIG. 2 is intended to illustrate how a number of nodes according to FIG. 1 coact through linear commit.

This figure shows that the coordinatorship is shifted in each step. The arrows show the preparatory and commit part in phase two of a transaction. The transaction coordinator asks participant 1a (1) to prepare, and forwards the coordinator ship. Participant 1a asks participant 1b (2) to prepare if participant 1a is able to undertake to carry out the transaction and forwards the coordinatorship. Participant 1b asks participant 1c (3) to prepare, if participant 1b is able to undertake to carry out the transaction, and forwards the coordinatorship. Participant 1c asks participant 1d (4) to prepare, if participant 1c is able to undertake to carry out the transaction.

Participant 1d sees that he is last in the chain and since the prepare request has reached him he knows that all preceding nodes have undertaken to carry out the transaction. Participant 1d has the coordinatorship and can thus send orders "commit" (5) to participant 1c, if participant 4 can himself carry out the commitment. When participant 1c receives the "commit" command from participant 1d, the participant 1c responds to participant 1b (6) with a "commit" command, and so on up to participant 1a (7), which is then able to send the message "committed" (8) to the transaction coordinator 1.

The transaction coordinator 1 will only receive the "committed"-message from participant 1a when all preceding participants 1b, 1c, 1d have undertaken to carry out the transaction. If any one of the participants, for instance participant 1c, declares itself "unprepared", the transaction is aborted.

Linear commit requires only two messages between participating nodes, although the response times are relatively long, since everything takes place serially. This is particularly the case when a large number of participating nodes is concerned.

A common test method for checking performance when carrying out transactions in a distributed database is to perform a so-called TPC-B-transaction. The participants in such a transaction are shown schematically in FIG. 3.

A TPC-B-transaction includes updating four different tables in the database.

A table may be divided into a number of different groups each including different parts of tables that are affected by the transaction. These table parts are placed physically in different nodes in the system. Thus, updating of a table necessitates updating the entire group, i.e. all affected parts.

In a TPC-B-transaction where four different tables shall be updated, all parts belonging to respective groups must be updated.

Figure 3:
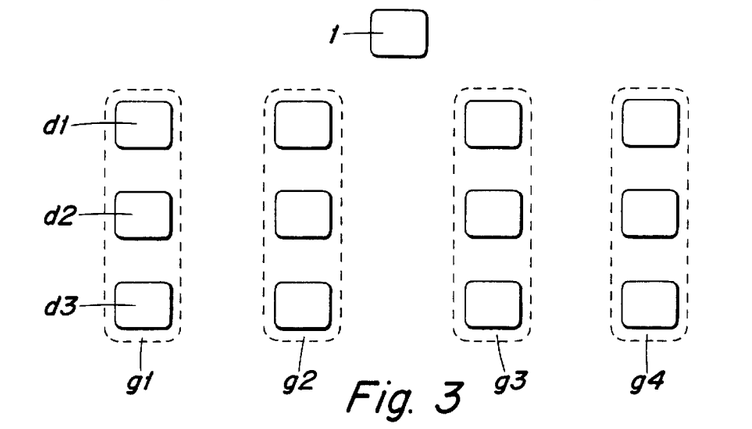
FIG. 3 is a schematic illustration of the mutual relationship between different nodes that are affected by a "TPC-B" transaction, said transaction affecting four groups with three participants in each group.

FIG. 3 shows a transaction coordinator 1 and four groups g1, g2, g3, g4, each including three different parts placed in a respective node. The first group g1 is thus placed in three participants d1, d2, d3, the second group g2 in three participants, and so on.

Figure 4:
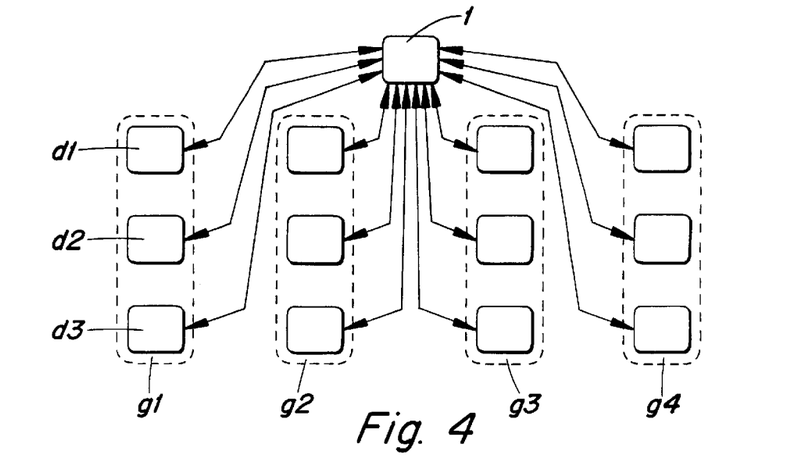
FIG. 4 illustrates schematically how a TPC-B-transaction is carried out by traditional commit in two phases.

As will be seen from FIG. 4, the use of traditional commit in two phases requires the transmission of four messages between the transaction coordinator 1 and respective participant, where respective two-directional arrows represent these four messages, which results in a number of 4*g*d messages, where g is the number of groups and d is the number of participants in respective groups. In the case of a TPC-B-transaction according to FIG. 3, this results in 48 messages, although twelve messages can be sent simultaneously at a time.

Figure 5:
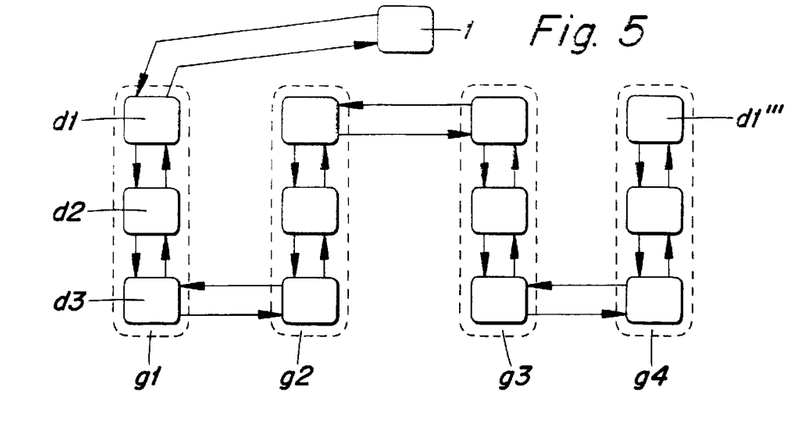
FIG. 5 illustrates schematically how a TPC-B-transaction is carried out by linear commit.

As will be seen from FIG. 5, when using linear commit in the same configuration of groups and nodes, the transaction coordinator 1 sends a message to a first participant d1. The coordinatorship is shifted to participant d1, which forwards the message and the coordinatorship serially to the last participant as illustrated, this last participant being participant d1''' in the fourth group g4. This participant is the last participant in the chain and the "commit"-message or "abort"-message, depending on what has happened earlier, is sent back through the chain to the transaction coordinator 1. This requires 2*g*d messages, which, in the case illustrated in FIG. 3, results in 24 messages, each serially one after the other.

DESCRIPTION OF PROPOSED EMBODIMENTS

Figure 6:
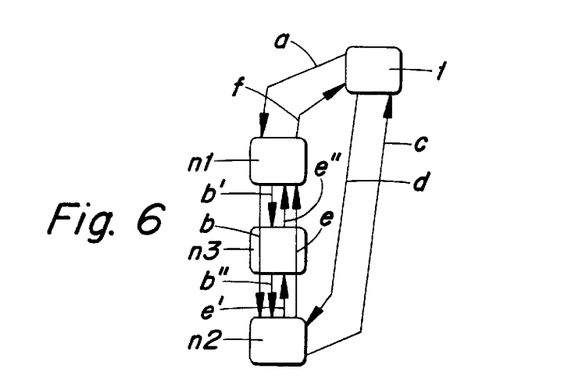
FIG. 6 is a simplified and schematic illustration of how part of a transaction is carried out in accordance with the invention.

FIG. 6 illustrates a method of carrying out a transaction that affects a number of nodes in a system of nodes in which information belonging to a distributed database is stored, this information being divided up into tables.

A transaction originates from a transaction coordinator 1 and affects at least one group g1 of parts of at least one first table of said number of tables.

This group g1 includes at least one first and one second part, and possibly one or more further parts.

The first part is stored in a first node n1, while the second part is stored in a second node n2 that is separate from the first node n1. Possible other parts in the group are stored in intermediate nodes, which are comprised of further nodes separate from one another and from the first and the second node.

The invention is based on the transaction being a two-safe transaction.

The message route between the transaction coordinator 1 and a group g1 will be described first. FIG. 6 shows that the transaction is opened with a first phase, in which:

the transaction coordinator 1 sends a "prepare"-message "a", i.e. sends a transaction preparatory request to the first node n1;

if the first node can undertake to carry out the transaction, the first node n1 sends a preparatory request "b" to the second node n2, either directly or via one or more intermediate nodes, or when the first node is unable to commit itself to carry out the transaction, the first node n1 sends an "unprepared"-message "b" to the second node n2, either directly or via one or more intermediate nodes;

when the second node is able to undertake commitment of the transaction, the second node n2 sends a "prepared"-message c", i.e. all affected nodes within the group are prepared to carry out the transaction, directly to the transaction coordinator 1, or when the second node is unable to commit itself to carrying out the transaction or if the second node has received an "unprepared"-message, the second node n2 sends an "unprepared"-message "c" direct to the transaction coordinator 1, which concludes the first phase.

By direct is meant that the message is sent with a direct address to a receiving node. However, this does not prevent the message from being sent via a node that does not participate in the transaction, but merely forwards the message in accordance with the message address. By indirect is meant that the message is sent by one or more nodes which are themselves participants in the transaction.

By way of example of an indirectly sent message, FIG. 6 shows that the first node sends the message "b'" to a third node n3 which also participates in the transaction and which, if the third node n3 is able to commit itself to carrying out the transaction, sends the message "b''", i.e. the preparation request, to the second node n2.

The first phase is followed by a second phase, in which:

the transaction coordinator 1 sends a message "d" concerning a measure to be carried out directly to the second node n2;

the second node n2 then sends the message "e" regarding measures to be taken to the first node n1, either directly or via one or more intermediate nodes; and in which the first node n1 then sends a concluding message "f" to the transaction coordinator 1, which concludes the second phase.

The message "d", "e" is a "commit"-message, i.e. a message stating commitment to carry out the measures in accordance with the transaction, and the concluding message "f" is "a committed"-message by which is meant that the measures according to the transaction are committed provided that the first phase is concluded with a "prepared"-message "c".

On the other hand, if the first phase is concluded with an "unprepared"-message "c", the message "d", "e" is an "abort"-message, in other words the transaction is aborted, and the concluding message "f" is an "aborted"-message, in other words the transaction is aborted.

It is also shown that when an intermediate node n3 participates in the transaction, the message "e" between the second node n2 and the first node n1 can be divided into two messages "e'", "e''" so as to pass via the intermediate node n3.

In order to simplify matters, the above description has been concerned with a transaction concerning a group g1, although it is usual for several groups to be affected by a transaction.

The TPC-B-transaction will be used here in an exemplifying form in order to elucidate the invention and also to compare the present invention with known technology in a simple way.

Figure 7:
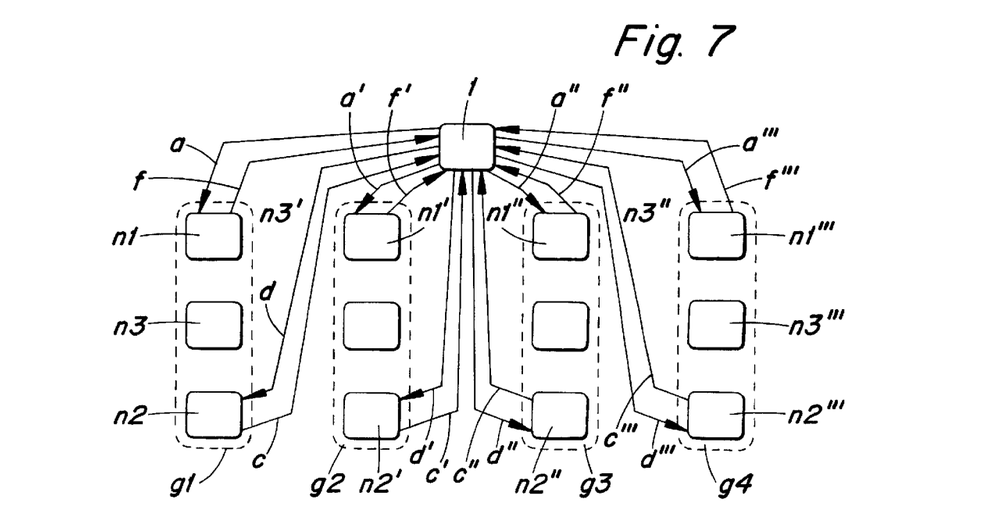
FIG. 7 illustrates schematically how a TPC-B-transaction is carried out in accordance with the invention.

Thus, FIG. 7 shows a transaction that affects a number of groups g1, g2, g3, g4 of table parts, where respective groups include parts belonging to the first table or parts belonging to some other table in the database and separate from the first table.

The parts are stored in first nodes n1, n1', n1", n1'" and second nodes n2, n2', n2", n2'" respectively, and possibly in one or more intermediate nodes n3, n3', n3", n3'", each being separate from the other in respective groups of parts.

The first phase is opened with a preparatory request "a", "a'", "a''", "a'''" from the transaction coordinator 1 to respective first nodes n1, n1', n1", n1'" and is concluded with a message "c" ,"c'", "c''", "c'''" "prepared" or "unprepared" from respective second nodes n2, n2', n2", n'" to the transaction coordinator 1.

The second phase is opened with a message "d", "d'", "d''", "d'''" from the transaction coordinator 1 to respective second nodes n2, n2', n2", n2'" regarding measures to be taken, and is concluded with a concluding message "f", "f'", "f''", "f'''" from respective first nodes n1, n1', n1", n1'" to the transaction coordinator 1.

The message "d", "d'", "d''", "d'''" is a commit message, i.e. performs the measures according to the transaction, and the concluding message "f", "f'", "f''", "f'''" is a committed message, i.e. the measures to be taken according to the transaction are committed, i.e. will be carried out, provided that the first phase is concluded with a "prepared"-message "c", "c'", "c''", "c'''" from all other nodes n2, n2', n2", n2'".

On the other hand, if the first phase is concluded with an "unprepared"-message "c", "c'", "c''", "c'''" from any node n2, n2', n2", n2'", the message is an "abort"-message, i.e. abort the transaction, and the concluding message "f", "f'", "f''", "f'''" is an "aborted"-message, i.e. the transaction is aborted.

The inventive method can be applied to particular benefit when the first part is allocated a higher priority than second parts within respective groups.

This is the case when respective groups comprise a fragment of the database, this fragment including the first part, the second part and a further part, where said further part is stored in a third node and where the higher priority allocated to the first part consists in the first part constituting a primary copy of one part of the table and the further part consisting in a secondary copy of the primary copy, and wherein said second part consists in a stand-by copy of the primary copy.

The manner in which safety copying of different parts of a table can be achieved in a distributed database, or how a database can be structured to ensure a high degree of reliability when safety copying will not be described in detail in this document. However, the reader is referred to the Swedish patent application relating to "Method to be used with a distributed database, and a system adapted to work according to the method" with the Swedish application number 97 02015-0 for a more detailed description of the aforesaid constituent parts of a fragment.

When each group g1, g2, g3, g4 forms a fragment which includes a primary copy, a secondary copy and a stand-by copy, where respective copies are stored in different nodes n1, n2, n3, there is obtained the aforesaid TPC-B-transaction in a transaction that involves four different fragments.

In this case, a transaction according to the present invention requires $2*f*(n+1)$ messages, where f is the number of fragments affected by a transaction and n is the number of copies within respective fragments, which for a TPC-B-transaction according to FIG. 7 means 32 messages. Of these 32 messages, four messages can be sent simultaneously, meaning the transmission of four "simultaneous" messages eight times.

In comparison with traditional commit in two phases, the slightly longer response time (eight times instead of four times) is compensated for by the smaller number of messages (32 instead of 48) that need to be sent.

In comparison with linear commit, the greater number of messages (32 instead of 24) is compensated for by the much shorter response time that is made possible by the partially simultaneous transmission of messages. The sequence is opened and concluded with the transaction coordinator 1, because the transaction coordinator 1 will then know whether or not the preparatory part has been completed, and consequently a request regarding correct measures can be sent immediately after the preparatory part. This makes possible the simultaneous message transmission and the much shorter response time than the linear commit response to be achieved.

In accordance with the invention, the preparation of the first node, n1, n1', n1", n1'" in the first phase can also involve the first node n1, n1', n1", n1'" causing a lock to be placed on all copies belonging to respective fragments.

The first node 1, n1', n1", n1'" also causes respective locks to be released, but only after the first node has received the message regarding measures to be carried out and has sent the concluding message to the transaction coordinator 1.

Thus, when the transaction coordinator 1 receives the concluding message "f", "f'", "f''", "f'''" from a first node n1, n1', n1", n1'", it will know that all nodes within this fragment have received the message regarding measures to be carried out. On the other hand, if the first node or any other node within a fragment should crash during the second phase and before the first node has had time to send the concluding message, the transaction coordinator will know that no node within this fragment has completed the transaction, since all nodes were locked in the first stage of this first phase and since the lock is still active.

Put more simply, it can be said that a crash of the first node, or some other node, will cause the message last sent to be resent to remaining nodes. Handling of a crashed node in accordance with the present invention will be described in more detail hereinafter with reference to FIG. 8.

According to one suitable method, a lock can be applied so that solely those parts of respective copies affected by the transaction will be made unavailable to other transactions, while remaining parts are left available for other transactions.

A lock can be applied by virtue of the first node n1, n1', n1", n1'" including a message to the effect that the lock shall be applied in conjunction with the first message a, a', a", a'" to all affected nodes within respective fragments.

A lock need not necessarily be released by sending a specific message to this effect to respective nodes. This would unnecessarily require an additional transaction phase. A transaction is normally followed by a cleaning-up message that includes a lock release instruction, among other things. Such a message is normally sent on the next occasion of sending a message between affected nodes, so-called piggy-backing, this next message having nothing to do with the transaction in question.

Another method of lock release is when the second node and possible intermediate nodes within respective fragments are aware that if a further transaction is requested that concerns a locked part, then the first node has accepted the commencement of a new transaction, indicating that the first node has released its lock. The second node and possible intermediate nodes therefore know that the lock can be released.

Retention of the coordinatorship of the transaction coordinator in combination with locking of all copies within a fragment controlled by respective first nodes, makes possible non-blocking handling of crashed nodes during a transaction.

Figure 8:
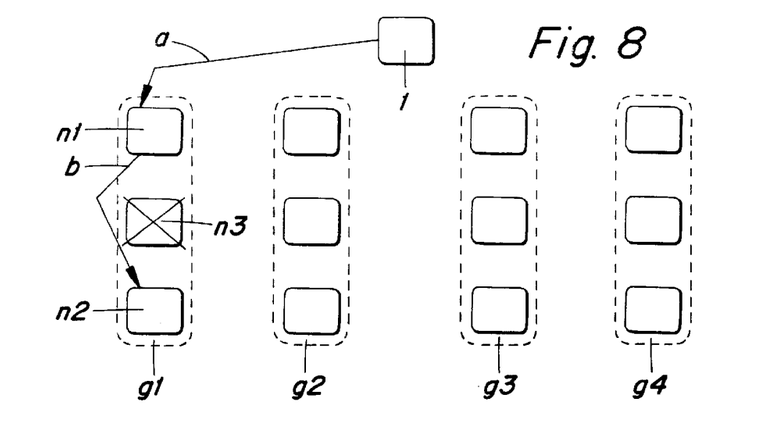
FIG. 8 illustrates schematically handling of a crashed node.

FIG. 8 illustrates procedure proposed in accordance with the invention in the event of one of the nodes within a fragment affected by a transaction crashing during the performance of the transaction. The crossed-out intermediate node n3 in the first group g1 is assumed to have crashed, wherewith the transaction coordinator 1 checks all ongoing message transmissions;

the halted transaction phase is re-started from the beginning;

the messages are sent in accordance with the phase but with the crashed node excluded from the message chain; and a node that receives an earlier received message ignores the message and forwards the same.

However, the transaction shall be aborted if a first node crashes within a fragment that is affected by the transaction during the preparatory phase of the transaction.

The FIG. 8 illustration, the intermediate node n3 has crashed during the first phase, and consequently the message "b" from the first node n1 goes directly to the second node n2.

Figure 9:
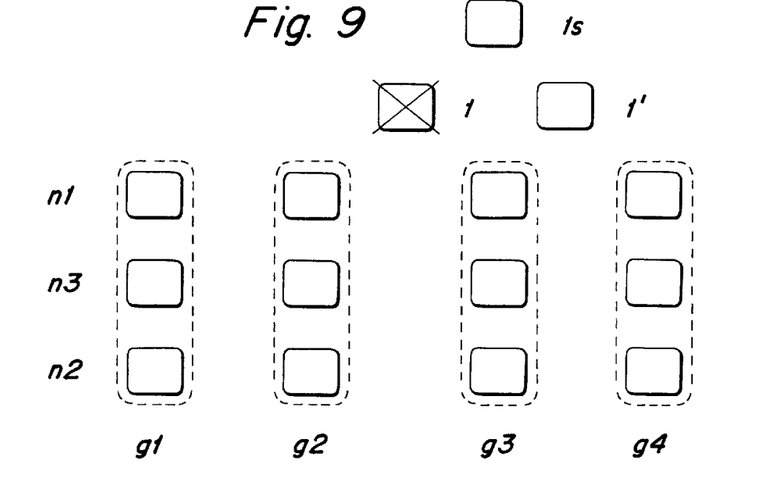
FIG. 9 illustrates schematically handling of a crashed transaction coordinator.

FIG. 9 illustrates a procedure in which in the event of a crash of the transaction coordinator 1 (crossed-over) during the performance of a transaction, a system coordinator Is functions to detect the crash of a node in the system, whereafter:

the system coordinator is sends a general query to all nodes in the system asking whether any node is a participant in a transaction in which the crashed node 1 constitutes the transaction coordinator;

a new node 1' is assigned the role of transaction coordinator;

all nodes in respective fragments g1, g2, g3 that are affected by the transaction compile a status report, which is sent to the new transaction coordinator and which includes the node-identity, fragment-identity, transaction status, and whether or not the node includes primary, secondary or stand-by copies within respective fragments; and the new transaction coordinator 1' decides on the basis of the status reports received whether the transaction shall be continued or be aborted.

Although the respective groups in the above description include three table parts, there is nothing to prevent the present invention being applied when respective groups include a first and a second part and when the higher priority of respective first parts consists in said first part comprising a primary copy of a part of a table, and the second part comprising a secondary copy of said primary copy.

Figure 10:
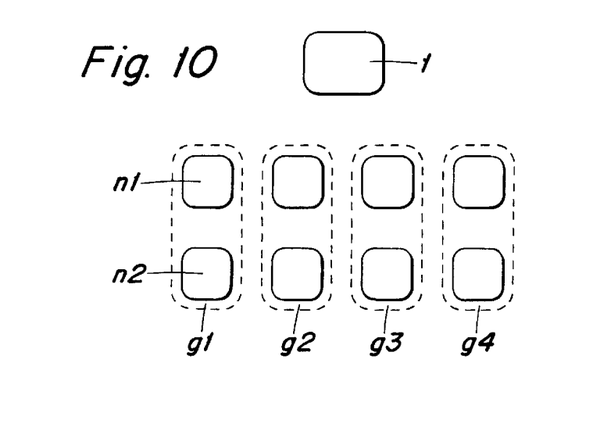
FIG. 10 is a schematic illustration of one example of groups where each group includes only two participants.

FIG. 10 illustrates an example in which a transaction coordinator 1 performs a transaction that affects four groups g1, g2, g3, g4, each including two nodes n1, n2 that contain primary and secondary copies of parts affected by the transaction.

As earlier mentioned, a system can constitute a primary system "p" and be supplemented with a secondary system "s". It is proposed in accordance with the invention that updating of such a secondary system "s" according to a transaction shall be requested prior to releasing the lock.

This updating can be effected through both a one-safe transmission and through a limited two-safe transmission. The method chosen will depend on the level of safety required by respective transactions. According to the invention, the attributes that control the transaction indicate whether updating of the secondary system shall be effected by means of one-safe transmission or limited two-safe transmission.

If all attributes controlling the transaction indicate that updating of the secondary system "s" shall be effected by means of a one-safe transmission, then updating is effected by means of one-safe transmission, whereas if any attribute controlling the transaction indicates that the secondary system "s" shall be updated by means of limited two-safe transmission, then the updating is effected by limited two-safe transmission.

Figure 11:
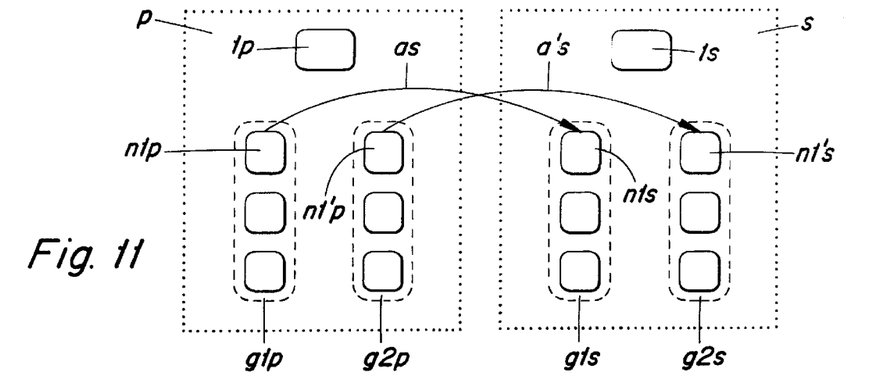
FIG. 11 illustrates schematically a first example of how a secondary system can be updating in accordance with the present invention.

FIG. 11 illustrates an example of updating by one-safe transmission. As illustrated, updating is effected by respective first nodes n1p, n1'p affected by transaction sending a "commit"-message "as", "a's" to corresponding nodes n1s, n1's within the secondary system "s". The transaction then continues without waiting for a response from respective affected nodes n1s, n1's within the secondary system "s".

Figure 12:
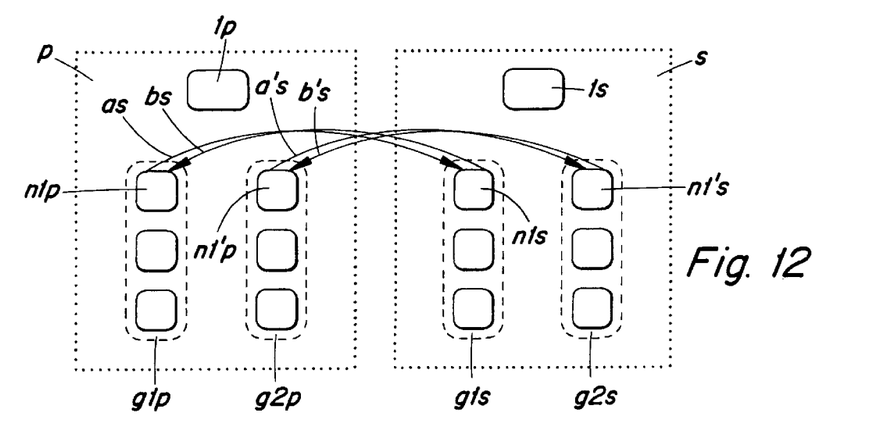
FIG. 12 illustrates schematically a second example of how a secondary system can be updating in accordance with the present invention.

FIG. 12 illustrates how updating by means of limited Two-safe transmission can be carried out. As illustrated, respective first nodes n1p, n1'p affected by the transaction send a "commit"-message "as", "a's" to corresponding nodes n1s, n1's within the secondary system "s".

As a part of the transaction, the first nodes n1p, n1'p await a response from affected nodes n1s, n1's within the secondary system "s", this response consisting in a "committed"-message "bs", "b's" from the first node n1p, n1'p, which indicates to the first node n1p, n1'p that the measures will be carried out, and that the secondary system "s" will thus be updated in accordance with the transaction, or an "aborted"-message "bs", "b's", which indicates to the first node n1p, n1'p that the measures will not be carried out and that the secondary system "s" will thus not be updated in accordance with the transaction.

An indication that the secondary system "s" will not be updated in accordance with the transaction causes the secondary system to be re-started so as to constitute a correct copy of the primary system "p".

The above described updating of a secondary system is referred to as a limited two-safe transmission, where the limitation consists in the fact that nodes within the secondary system do not have the right to ask for the transaction to be stopped or aborted.

In the method of updating a secondary system described with reference to FIG. 11, affected nodes in the primary system do not receive any indication as to whether or not the secondary system will be updated in accordance with the transaction in a natural way. This does not prevent such indication being generated in some other way, however, meaning, in turn, that the secondary system will be re-started so as to constitute a copy of the primary system "p" in a correct manner upon request for a non-performable updating of the secondary system.

Thus, the difference between updating by one-safe transmission or limited two-safe transmission is that in the case of limited two-safe transmission it is known immediately whether or not the secondary system is updated, whereas with one-safe transmission there can be a difference between the primary and secondary system for a brief period.

Different transactions cause different changes, of which certain changes are less sensitive to malfunctions than others. Thus, one of the transaction controlling attributes can determine whether the transaction shall be performed by means of one-safe transmission or limited two-safe transmission when updating the secondary system.

The insertion of personal data belonging to a subscriber in a mobile telephone network is one example of a transaction that could require limited two-safe transmission when updating the secondary system. In this case, it is important that correct information is found in both the primary and the secondary system.

The insertion of the temporary position of a subscriber within a mobile telephone network is an example of a transaction where one-safe transmission may be sufficient in updating the secondary system. Since the position of a mobile in a mobile telephone network will constantly change and will therefore be updated repeatedly as time passes, the importance of correct information in the secondary system in this regard is not as critical as in the former case.

It may also be that when an indication is received to the effect that the secondary system will not be updated in accordance with such a transaction, this does not necessarily mean that the secondary system must be re-started, since the secondary system will presumably be updated correctly the next time the geographical location of a specific subscriber changes.

Figure 13:
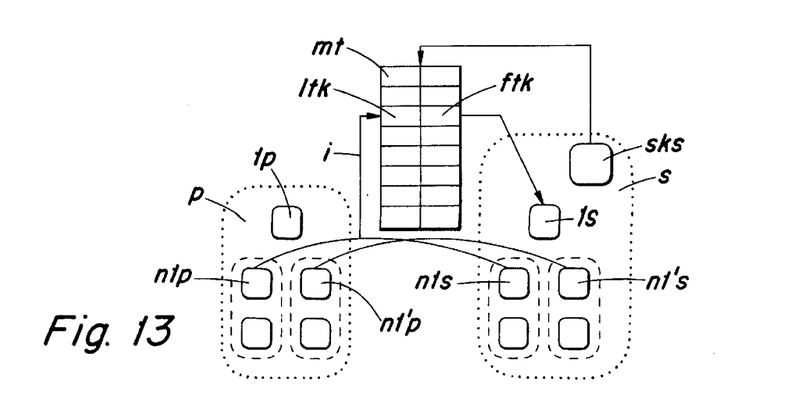
FIG. 13 is a schematic illustration showing how a mapping table operates in the selection of a transaction coordinator within a secondary system when updating said secondary system.

In response to a request regarding updating of the secondary system "s" in accordance with a transaction within the primary system "p", information is sent from affected nodes in the primary system "p" to affected nodes within the secondary system "s" from where a logic transaction coordinator can be chosen. The choice of transaction coordinator within the secondary system is controlled by this information and by momentary loading of nodes belonging to the secondary system. FIG. 13 is intended to show that the information "i" can consist in the transaction coordinator 1p in the primary system "p" choosing a logical transaction coordinator 1tk from a mapping table mt of possible logical transaction coordinators within the secondary system "s". This choice is made so that the duty of acting as a transaction coordinator will be distributed randomly between the logical transaction coordinators that can be chosen from the mapping table mt.

Respective logical transaction coordinators 1tk in the mapping table mt can be mapped to a physical node 1s or physical transaction coordinators ftk acting within the secondary system. The mapping table mt is stored within, or available for, each node belonging to the secondary system "s". When respective nodes within the secondary system affected by a transaction receive information "i" as to which logical transaction coordinator 1tk has been selected, these nodes identify through a mapping table mt the same physical transaction coordinators ftk within the secondary system "s".

A system coordinator sks in the secondary system sees that all positions in the mapping table mt are occupied by nodes that are available to act as transaction coordinators. Thus, when certain nodes are heavily loaded, the system coordinator sks ensures that these nodes are not included in the mapping table. This provides a certain degree of load control on the nodes within the secondary system "s".

It will be understood that the invention is not restricted to the aforedescribed and illustrated exemplifying embodiments thereof and that modifications can be made within the scope of the inventive concept as defined in the following claims.

What is claimed is:

1. A method of performing a transaction that affects a plurality of nodes within a system of nodes in which information belonging to a distributed data base is stored, wherein said information is divided into tables and said transaction originates from a transaction coordinator, wherein said transaction affects at least one group of parts of at least one first table of said number of tables, wherein said group includes at least a first and a second part and possibly one or more further parts, wherein said first table part is stored in a first node and said second table part is stored in a second node that is separate from said first node, wherein possible other table parts in said group are stored in intermediate nodes comprised of further nodes that are separate from each other and from said first and said second node, and wherein said transaction is a two-safe transaction, characterized by opening said transaction with a first phase in which:

said transaction coordinator sends a "prepare"-message, by which is meant a request asking the first node to prepare for said transaction;

when said first node is able to undertake said transaction, said first node sends a prepare request to said second node either directly or via one or more intermediate nodes, or when said first node is unable to carry out said transaction, said first node sends an "unprepared"-message to said second node, either directly or via one or more intermediate nodes;

when said second node is able to undertake said transaction, said second node sends a "prepared"-message directly to said transaction coordinator, i.e. a message indicating that all affected nodes are prepared to undertake said transaction; or when said second node is unable to carry out said transaction or when said second node has received an "unprepared"-message, said second node sends an "unprepared"-message directly to said transaction coordinator, which concludes said first phase, wherein said first phase is followed by a second phase in which:

said transaction coordinator sends directly to said second node a message regarding measures to be carried out;

said second node then sends said message regarding said measures to said first node, either directly or via one or more intermediate nodes; and in which said first node then sends a concluding message to said transaction coordinator;

therewith concluding said second phase, where said message regarding said measures is a "commit"-message, i.e. a message to carry out the measures in accordance with said transaction, and said concluding message is a "committed"-message i.e. a message stating that the measures have been carried out in accordance with the transaction, provided that the first phase is concluded with a "prepared"-message, or when said message regarding said measures is an "abort"-message, i.e. a message to abort said transaction and said concluding message is an "aborted"-message, i.e. the transaction is aborted, when said first phase is concluded with an "unprepared"-message, wherein said transaction affects further groups of table parts where respective groups include parts belonging to said first table or parts belonging to some other table within said data base but separate from said first table; wherein said table parts are stored in first and second nodes and possibly in one or more intermediate nodes, each being separate from the other within respective groups of parts; wherein said first phase is opened with said preparatory request from said transaction coordinator to respective first nodes and is concluded with a "prepared"-message or an "unprepared"-message from respective second nodes to said transaction coordinator; wherein said second phase is opened with said message regarding measures to be carried out from said transaction coordinator to respective second nodes and concluded with said concluding message from respective first nodes to said transaction coordinator, said message regarding measures to be carried out is a "commit"-message, i.e. a message to carry out measures in accordance with said transaction, and said concluding message is a "committed" message, i.e. a message stating that the measures have been carried out in accordance with the transaction, when said first phase is concluded with a "prepared"-message from all second nodes, or when said message regarding said measures is an "abort"-message, i.e. a message to abort said transaction and said concluding message is a transaction aborted message, when said first phase is concluded with an "unprepared" message from any second node.

2. A method according to claim 1, characterized by allocating said first part a higher priority than other parts in respective groups.

3. A method according to claim 2, characterized in that respective groups comprise a fragment of a table included in said database, said fragment including said first part, said second part, and a further part; in that said further part is stored in a third node; and in that said higher priority exists in said first part constituting a primary copy of a part of said table; in that said further part forms a secondary copy of said primary copy; and in that said second part forms a stand-by copy of said primary copy.

4. A method according to claim 3, characterized in that preparation of said first node in said first phase includes said first node generating and applying a lock on all copies belonging to said fragment.

5. A method according to claim 2, characterized in that respective groups include a first and a second part; in that said second higher priority consists in said first part consisting in a primary copy of a part of said table; and in that said second part consists in a secondary copy of said primary copy.

6. A method according to claim 1, characterized in that respective groups include one or more further parts which are stored within said intermediate node/nodes; in that messages in said first phase are sent serially from said first node to said intermediate node/nodes and from there to said second node; and in that messages in said second phase are sent serially from said second node to said intermediate node/nodes and from there to said first node.

7. A method according to claim 6, characterized in that respective groups comprise a fragment of a table included in said database, said fragment including said first part, said second part, and a further part; in that said further part is stored in a third node; and in that said higher priority exists in said first part constituting a primary copy of a part of said table; in that said further part forms a secondary copy of said primary copy; and in that said second part forms a stand-by copy of said primary copy.

8. A method according to claim 1, characterized by allocating said first part a higher priority than other parts in respective groups.

9. A method according to claim 1, characterized in that respective groups include one or more further parts which are stored within said intermediate node/nodes; in that messages in said first phase are sent serially from said first node to said intermediate node/nodes and from there to said second node; and in that messages in said second phase are sent serially from said second node to said intermediate node/nodes and from there to said first node.

10. A method according to claim 3, in that preparation of said first node in said first phase includes said first node generating and applying a lock on all copies belonging to said fragment.

11. A method according to claim 10, characterized in that the first node generates the release of said lock in respect of all copies belonging to said fragment only after said first node has received said message regarding measures to be carried out and has sent said concluding message.

12. A method according to claim 11, characterized in that said lock is applied in accordance with an appropriate method, for instance such as to render unavailable solely those parts of respective copies that are affected by said transaction while leaving remaining parts available for other transactions.

13. A method according to claim 11 wherein said system is supplemented with a secondary system, characterized in that updating of said secondary system in accordance with said transaction is requested before said lock is released.

14. A method according to claim 10, characterized in that said lock is applied in accordance with an appropriate method, for instance such as to render unavailable solely those parts of respective copies that are affected by said transaction while leaving remaining parts available for other transactions.

15. A method according to claim 14, wherein said system is supplemented with a secondary system, characterized in that updating of said secondary system in accordance with said transaction is requested before said lock is released.

16. A method according to claim 10, wherein said system is supplemented with a secondary system, characterized in that updating of said secondary system in accordance with said transaction is requested before said lock is released.

17. A method according to claim 16, wherein respective transactions are followed by different attributes that control the performance of the transaction concerned, characterized in that when all of said attributes indicate that said secondary system shall be updated by means of a one-safe transmission, said updating is effected by means of a one-safe transmission; and in that if any of said attributes indicates that said secondary system shall be updated by means of a limited two-safe transmission, said secondary system is updated by means of a limited two-safe transmission.

18. A method according to claim 17, characterized in that a one-safe transmission includes respective first nodes affected by said transaction sending a "commit"-message to corresponding nodes within said secondary system regarding those measures to be carried out, whereafter the transaction continues.

19. A method according to claim 17, characterized in that a limited two-safe transmission includes a respective first node affected by said transaction sending a "commit"-message to corresponding nodes within said secondary system regarding which measures shall be performed, whereafter said corresponding nodes within said secondary system respond by sending to said first node a "committed"-message indicating to said first node that said measures will be performed and that the secondary system will thus be updated in accordance with said transaction, or with a message "abort", indicating to said first node that said measures will not be performed and that said secondary system will thus not be updated in accordance with said transaction.

20. A method according to claim 16, characterized in that a one-safe transmission includes respective first nodes affected by said transaction sending a "commit"-message to corresponding nodes within said secondary system regarding those measures to be carried out, whereafter the transaction continues.

21. A method according to claim 15, characterized by generating an indication that a requested measure cannot be carried out and sending this indication from said secondary system to said primary system in a separate transaction or as a part of another transaction between said secondary and said primary systems.

22. A method according to claim 21, characterized in that said secondary system is re-started so as to correctly comprise a copy of said system, when it is indicated that said secondary system will not be updated in accordance with said transaction.

23. A method according to claim 15, characterized in that the information that is sent to respective nodes within said secondary system in conjunction with updating said secondary system includes the information necessary for creating a logical transaction coordinator within said secondary system; and in that a physical transaction coordinator is selected within said secondary system on the basis of said information and on the basis of momentary loading of nodes belonging to said secondary system.

24. A method according to claim 23, characterized in that a mapping table is stored in or available to all nodes belonging to said secondary system; in that said mapping table is a table which enables mapping from a logical transaction coordinator to a physical node within said secondary system to be achieved; in that said information from said primary system includes a choice of logical transaction coordinator within said secondary system; in that a system coordinator in said secondary system ensures that all logical transaction coordinators can be mapped to a physical node within said secondary system; and in that the mapping table includes solely nodes that are available to act as a transaction coordinator in the event of a transaction.

25. A method according to claim 16, characterized in that a limited two-safe transmission includes a respective first node affected by said transaction sending a "commit"-message to corresponding nodes within said secondary system regarding which measures shall be performed, whereafter said corresponding nodes within said secondary system respond by sending to said first node a "committed"-message indicating to said first node that said measures will be performed and that the secondary system will thus be updated in accordance with said transaction, or with a message "abort", indicating to said first node that said measures will not be performed and that said secondary system will thus not be updated in accordance with said transaction.

26. A method according to claim 25, characterized in that said secondary system is re-started so as to correctly comprise a copy of said system, when it is indicated that said secondary system will not be updated in accordance with said transaction.

27. A method according to claim 25, characterized in that the information that is sent to respective nodes within said secondary system in conjunction with updating said secondary system includes the information necessary for creating a logical transaction coordinator within said secondary system; and in that a physical transaction coordinator is selected within said secondary system on the basis of said information and on the basis of momentary loading of nodes belonging to said secondary system.

28. A method of performing a transaction that affects a plurality of nodes within a system of nodes in which information belonging to a distributed data base is stored, wherein said information is divided into tables and said transaction originates from a transaction coordinator, wherein said transaction affects at least one group of parts of at least one first table of said number of tables, wherein said group includes at least a first and a second part and possibly one or more further parts, wherein said first table part is stored in a first node and said second table part is stored in a second node that is separate from said first node, wherein possible other table parts in said group are stored in intermediate nodes comprised of further nodes that are separate from each other and from said first and said second node, and wherein said transaction is a two-safe transaction, characterized by opening said transaction with a first phase in which:

said transaction coordinator sends a "prepare"-message, by which is meant a request asking the first node to prepare for said transaction;

when said first node is able to undertake said transaction, said first node sends a prepare request to said second node either directly or via one or more intermediate nodes, or when said first node is unable to carry out said transaction, said first node sends an "unprepared"-message to said second node, either directly or via one or more intermediate nodes;

when said second node is able to undertake said transaction, said second node sends a "prepared"-message directly to said transaction coordinator, i.e. a message indicating that all affected nodes are prepared to undertake said transaction; or when said second node is unable to carry out said transaction or when said second node has received an "unprepared"-message, said second node sends an "unprepared"-message directly to said transaction coordinator, which concludes said first phase, wherein said first phase is followed by a second phase in which:

said transaction coordinator sends directly to said second node a message regarding measures to be carried out;

said second node then sends said message regarding said measures to said first node, either directly or via one or more intermediate nodes; and in which said first node then sends a concluding message to said transaction coordinator;

therewith concluding said second phase, where said message regarding said measures is a "commit"-message, i.e. a message to carry out the measures in accordance with said transaction, and said concluding message is a "committed"-message, i.e. a message stating that the measures have been carried out in accordance with the transaction, provided that the first phase is concluded with a "prepared"-message, or when said message regarding said measures is an "abort"-message, i.e. a message to abort said transaction, and said concluding message is an "aborted"-message, i.e. the transaction is aborted, when said first phase is concluded with an "unprepared"-message, wherein one of said nodes affected by said transaction crashes during the performance of said transaction, characterized in that said transaction coordinator checks all ongoing message transmissions; the transaction phase that has been halted is re-started from the beginning;

the messages are sent in accordance with said phase but with the exclusion of the crashed node; and if a node receives an earlier received message, the node ignores said message and forwards the same.

29. A method according to claim 28, characterized in that the transaction is aborted when said crashed node is a first node within a fragment that is affected by said transaction and when the crash occurs during the preparatory phase of said transaction.

30. A method of performing a transaction that affects a plurality of nodes within a system of nodes in which information belonging to a distributed data base is stored, wherein said information is divided into tables and said transaction originates from a transaction coordinator, wherein said transaction affects at least one group of parts of at least one first table of said number of tables, wherein said group includes at least a first and a second part and possibly one or more further parts, wherein said first table part is stored in a first node and said second table part is stored in a second node that is separate from said first node, wherein possible other table parts in said group are stored in intermediate nodes comprised of further nodes that are separate from each other and from said first and said second node, and wherein said transaction is a two-safe transaction, characterized by opening said transaction with a first phase in which:

said transaction coordinator sends a "prepare"-message, by which is meant a request asking the first node to prepare for said transaction;

when said first node is able to undertake said transaction, said first node sends a prepare request to said second node either directly or via one or more intermediate nodes, or when said first node is unable to carry out said transaction, said first node sends an "unprepared"-message to said second node, either directly or via one or more intermediate nodes;

when said second node is able to undertake said transaction, said second node sends a "prepared"-message directly to said transaction coordinator, i.e. a message indicating that all affected nodes are prepared to undertake said transaction; or when said second node is unable to carry out said transaction or when said second node has received an "unprepared"-message, said second node sends an "unprepared"-message directly to said transaction coordinator, which concludes said first phase, wherein said first phase is followed by a second phase in which:
said transaction coordinator sends directly to said second node a message regarding measures to be carried out;
said second node then sends said message regarding said measures to said first node, either directly or via one or more intermediate nodes; and in which
said first node then sends a concluding message to said transaction coordinator;
therewith concluding said second phase, where said message regarding said measures is a "commit"-message, i.e. a message to carry out the measures in accordance with said transaction, and said concluding message is a "committed"-message, i.e. a message stating that the measures have been carried out in accordance with the transaction, provided that the first phase is concluded with a "prepared"-message, or when said message regarding said measures is an "abort"-message, i.e. a message to abort said transaction, and said concluding message is an "aborted"-message, i.e. the transaction is aborted, when said first phase is concluded with an "unprepared"-message,
wherein the transaction coordinator crashes during the performance of said transaction and wherein a system coordinator is adapted to detect the crash of a node in the system, characterized in that
the system coordinator sends a general query to all nodes in said system asking whether or not a node is a participant in a transaction where said crashed node is a transaction coordinator;
a new node is allocated the role of transaction coordinator;
all respective nodes affected by said transaction compile a status report which is sent to the new transaction coordinator, and in that
said new transaction coordinator determines on the basis of said status reports whether said transaction shall continue or be aborted.

* * * * *